UNITED STATES PATENT OFFICE.

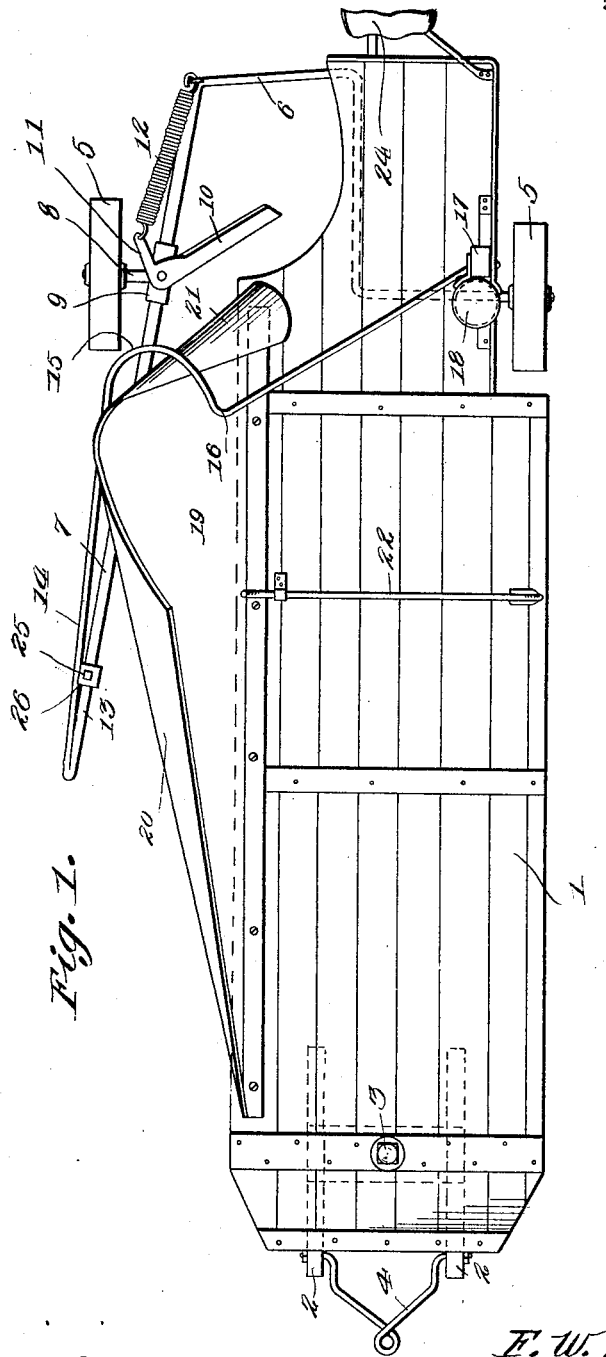

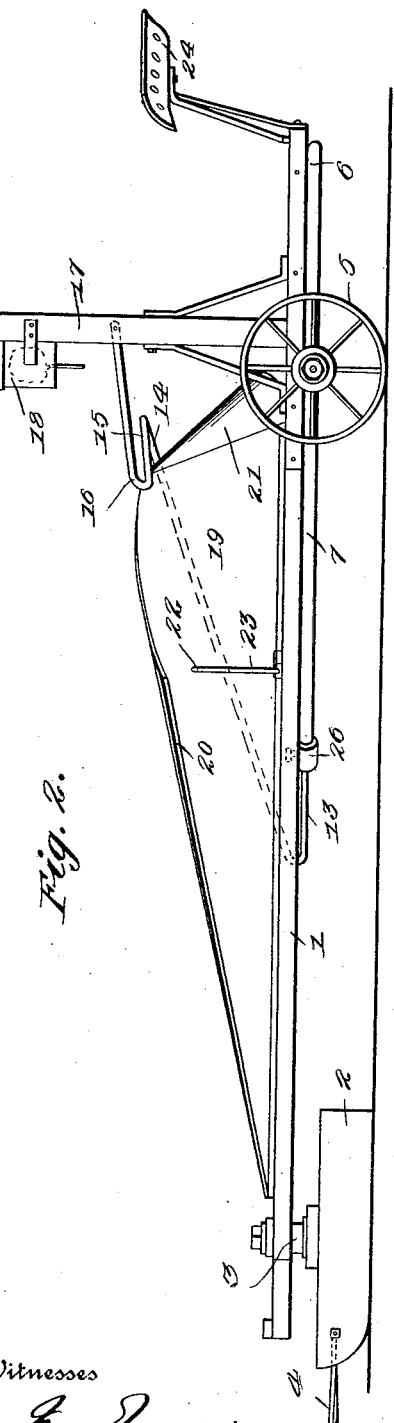

FREDERICK W. DILL, OF LINCOLN, KANSAS.

CORN-HARVESTER.

1,119,072.  Specification of Letters Patent.  Patented Dec. 1, 1914.

Application filed September 23, 1913. Serial No. 791,367.

*To all whom it may concern:*

Be it known that I, FREDERICK W. DILL, a citizen of the United States, residing at Lincoln, in the county of Lincoln and State of Kansas, have invented certain new and useful Improvements in Corn-Harvesters, of which the following is a specification.

This invention relates to corn harvesters, and has for its object the simplification of the construction to the end that an efficient corn harvester may be produced at a low cost.

Another object of the invention is to provide efficient and novel means for directing the corn stalks against the knife and over upon the platform, and a further object is to provide means for supporting the cut stalks in position to be easily tied into a bundle.

A still further object of the invention is to provide a novel knife which will automatically act upon the stalks to sever the same.

A type of corn harvester embodying my improvements is illustrated in the accompanying drawings, and the invention consists in certain novel features which will be hereinafter first fully described and then more particularly pointed out in the claims following the description.

In the drawings: Figure 1 is a plan view of a corn harvester constructed in accordance with my invention; Fig. 2 is a side elevation of the same; Fig. 3 is a front end elevation with parts in section; Fig. 4 is a detail sectional view of a portion of the guiding arm.

In carrying out my invention, I employ a platform 1 which may be of any desired dimensions and is illustrated as supported at its front end upon a pair of runners or sled 2 which is pivotally connected with the platform, as indicated at 3. A pair of hounds, or other draft device, 4 is attached to the said sled or runners so that the machine may be drawn over the field and easily guided. The rear end of the platform may also be supported upon runners, if preferred, but I have illustrated it as supported upon a pair of wheels 5 one of which is mounted upon the end of a combined axle and frame bar 6 which is secured to the under side of the platform and extends to the rear extremity thereof and is then extended laterally beyond the side of the platform to receive and support the rear end of a fender or guide arm 7. The other wheel 5 is mounted upon a stub-axle 8 which projects laterally from a casting 9 slidably mounted upon the said bar or arm 7 so that the wheel may be adjusted to such point as will most advantageously support the platform.

As shown clearly in Figs. 1 and 3, the guiding and supporting arm 7 is spaced from the side edge of the platform and extends forwardly in divergent relation thereto, the object being to permit the machine to be drawn over the field with the platform adjacent the row of standing plants, so that as the machine travels forwardly the platform and the guiding arm will pass on opposite sides of the row so that the knife 10 mounted upon the casting 9 will be drawn against the plants and cut down the same. The said knife is pivotally mounted upon the casting 9 and has an outer arm 11 projecting beyond its pivot, a spring 12 being attached to the extremity of said arm and to the rear end of the supporting bar or arm 7 or the laterally extending portion of the axle 6 so that the spring normally holds the knife across the space between the guide arm and the platform. When the knife is drawn against the standing plants the spring will yield sufficiently to prevent bending of the knife but will exert sufficient force to hold the knife against the stalk so that the continued travel of the machine will draw the knife through the stalk and, consequently, sever the same. The guiding arm or bar 7 is preferably tubular and in the front end of said arm is secured the extremity 13 of a deflector 14 which extends slightly forward from the front end of the guiding bar or arm and then extends upwardly and rearwardly to a point in advance of the knife but near the same, whence it is carried transversely toward the platform in a curve 15 which terminates at a point 16 substantially over the adjacent edge of the platform. From the said point 16 the deflector extends diagonally across the platform to the post 17 to which it is secured. The said post 17 is, as clearly shown, erected upon the platform at the side opposite the knife and carries a twine holder 18 so that a supply of binding twine will be within convenient reach of the operator.

Secured upon the edge of the platform, adjacent the guiding arm 7 and the deflector 14, is a plate 19 which constitutes a co-acting guide and deflector and also serves as a wind-shield. This combined deflector and wind-shield is preferably a sheet metal plate having one edge co-extensive with and rigidly secured to the edge of the platform and having its body portion inclined upwardly and outwardly from said edge. The plate is substantially triangular, the base of the triangle being secured to the platform and the sides of the triangle rising therefrom. The edges of the plate forming the sides of the triangle are rolled inwardly toward the platform and over the main body of the plate, as shown at 20 and 21, so as to present convex surfaces to the plants as they are forced inwardly to the platform whereby injury to the plants as they are loaded onto the platform will be avoided. The rear extremity of this combined wind-shield and deflector extends close to the knife 10 so that the stalks will be held in proper position to be cut by the knife and will be properly tilted so that they will drop upon the platform in such relation that they may be easily gathered into a bundle. To facilitate the bundling of the cut stalks, I provide a rest 22 consisting of a suitable bar disposed transversely upon the platform and supported above the same by standards or other supports 23 rising from the platform. It will thus be seen that the stalks will be supported in such position that a length of binding twine may be readily passed around the same and they are prevented from rolling from the platform by making the outer end of the rest 22 higher than the inner end thereof, as shown clearly in Fig. 3.

A seat 24 is preferably provided at the rear end of the platform for the driver, but this seat may, of course, be placed at any other convenient point or may be omitted entirely.

It will be readily seen that I have provided a simple corn harvester which will cut down the standing plants as it is drawn over the field and will support the plants in position to be easily tied into a bundle without any liability of any of the stalks being lost. The terminal 13 of the deflector 14 is adjustably held in the front extremity of the guiding and supporting bar 7 by a set-screw 25 threaded into the end of the arm, and a reinforcing collar 26 mounted thereon, and adapted to bear against the terminal 13, as clearly shown in Fig. 4. By this arrangement, I am enabled to adjust the deflector 14 so that it will be brought into the proper relation to the deflector 19 to accommodate stalks of any thickness and effectually hold the stalks to the co-acting deflector as the machine passes along the row.

What I claim is:—

1. A corn harvester comprising a portable platform, a plate secured to the platform and extending along one side thereof, said plate projecting outwardly and upwardly from the platform and having its upper edge and its rear edge rolled inwardly toward the platform over its main body, and a co-acting deflector supported from the platform beyond and in spaced relation with the said plate.

2. A corn harvester comprising a portable platform, a guiding and supporting arm carried by the platform in spaced relation to the side thereof, co-acting deflectors carried by said arm and the platform, a knife pivoted upon the said arm in rear of and adjacent the deflectors and extending inwardly from the supporting arm, an arm extending from the said knife laterally beyond the pivot thereof, and a spring secured in rear of the knife and attached to the extremity of said arm.

3. A corn harvester comprising a portable platform, a support projecting laterally from the platform, an arm projecting forwardly from said support in divergent spaced relation to the side of the platform, a deflector rod secured to the front end of said arm and extending inwardly and rearwardly therefrom and having its rear portion carried transversely over the platform, a knife pivotally mounted on said arm and extending toward the platform, means for holding the knife normally advanced, and a deflector plate secured to the side of the platform and inclined outwardly and upwardly therefrom, the upper and rear edges of said deflector plate being rolled inwardly over the body thereof and the deflector rod having a transverse portion curved concentrically with the rear rolled edge of the deflector plate.

In testimony whereof I affix my signature in presence of two witnesses.

FREDERICK W. DILL. [L. S.]

Witnesses:
J. J. MOFFITT, Sr.,
GEO. HUNDERTMARK.